(12) United States Patent  
Iwamura

(10) Patent No.: US 7,596,300 B2  
(45) Date of Patent: Sep. 29, 2009

(54) SYSTEM AND METHOD FOR SMOOTH FAST PLAYBACK OF VIDEO

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 744 days.

(21) Appl. No.: 11/295,951

(22) Filed: Dec. 7, 2005

(65) Prior Publication Data

US 2007/0127881 A1 Jun. 7, 2007

(51) Int. Cl.  
*H04N 5/91* (2006.01)  
*H04N 7/26* (2006.01)

(52) U.S. Cl. .................. 386/68; 386/111

(58) Field of Classification Search .............. 386/68, 386/67, 125, 124, 46, 6, 109, 111, 112  
See application file for complete search history.

(56) References Cited

U.S. PATENT DOCUMENTS

| | | | |
|---|---|---|---|
| 5,377,051 A * | 12/1994 | Lane et al. | 386/81 |
| 5,576,902 A | 11/1996 | Lane et al. | 386/68 |
| 5,768,536 A | 6/1998 | Strongin et al. | 395/200.77 |
| 5,949,948 A | 9/1999 | Krause et al. | 286/6 |
| 6,023,553 A * | 2/2000 | Boyce et al. | 386/109 |
| 6,167,088 A | 12/2000 | Sethuraman | 375/240.1 |
| 6,356,708 B1 | 3/2002 | Krause et al. | 386/109 |
| 6,510,554 B1 | 1/2003 | Gordon et al. | 725/90 |
| 6,578,070 B1 | 6/2003 | Weaver et al. | 709/206 |
| 6,658,199 B1 | 12/2003 | Hallberg | 386/68 |
| 6,738,980 B2 | 5/2004 | Lin et al. | 725/88 |
| 6,865,220 B2 | 3/2005 | Abrishami | 375/220 |
| 2001/0046259 A1 | 11/2001 | Abrishami | 375/222 |
| 2002/0168175 A1 | 11/2002 | Green et al. | 386/68 |
| 2003/0077070 A1 | 4/2003 | Lin et al. | 386/68 |
| 2003/0077072 A1 | 4/2003 | Lin et al. | 386/68 |
| 2003/0079229 A1 | 4/2003 | Lin | 725/88 |
| 2003/0159152 A1 | 8/2003 | Lin et al. | 725/87 |
| 2005/0028213 A1 | 2/2005 | Adler et al. | 725/89 |
| 2005/0074225 A1 | 4/2005 | Lin et al. | 386/46 |
| 2005/0094970 A1 | 5/2005 | Pietraszak | 386/68 |

* cited by examiner

*Primary Examiner*—Robert Chevalier  
(74) *Attorney, Agent, or Firm*—John L. Rogitz

(57) ABSTRACT

I-frames are transcoded to lower than normal rates during fast playback modes, so that smoother fast playback is performed at the original stream rate because no I-frame need be dropped.

22 Claims, 4 Drawing Sheets

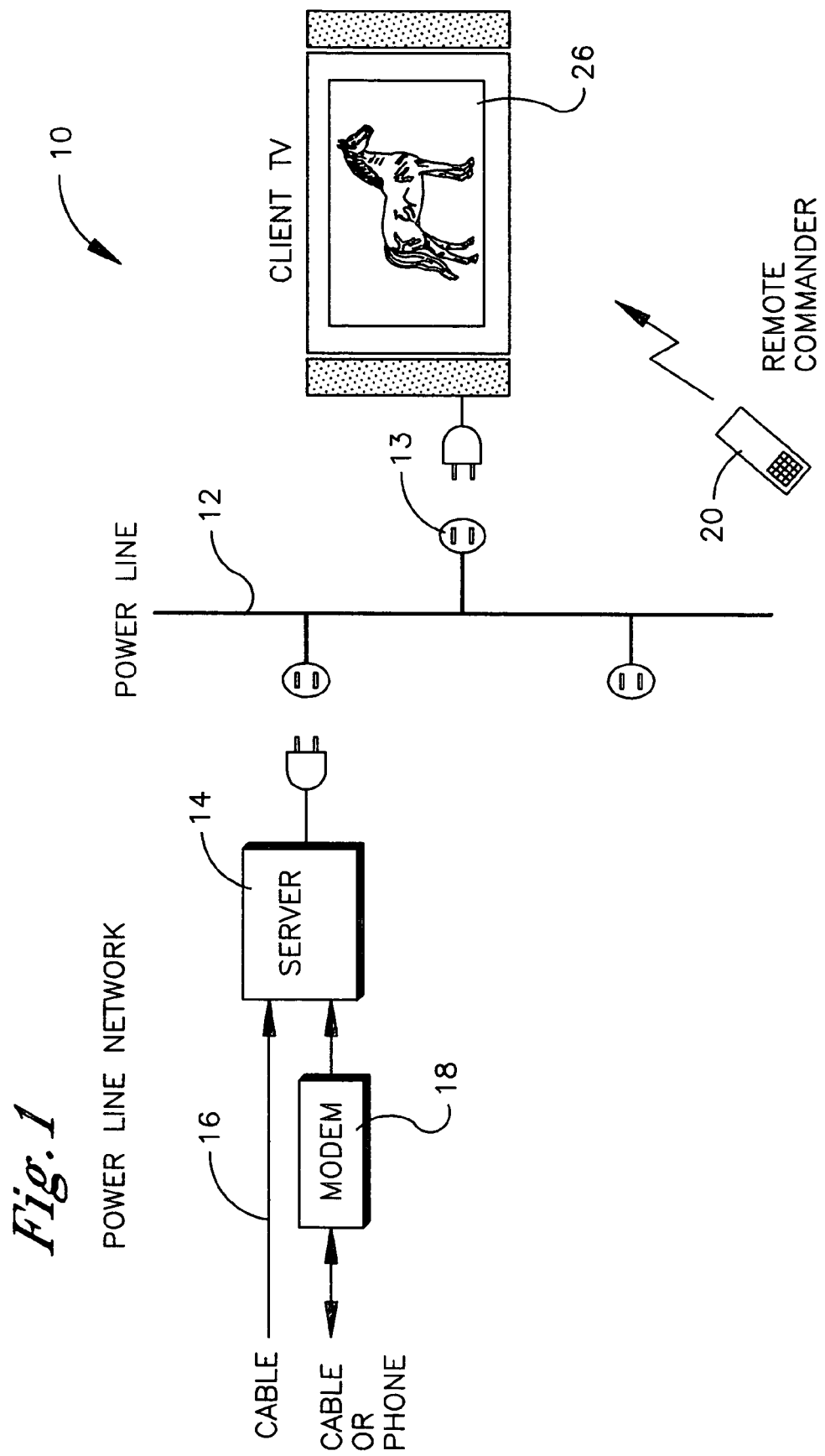

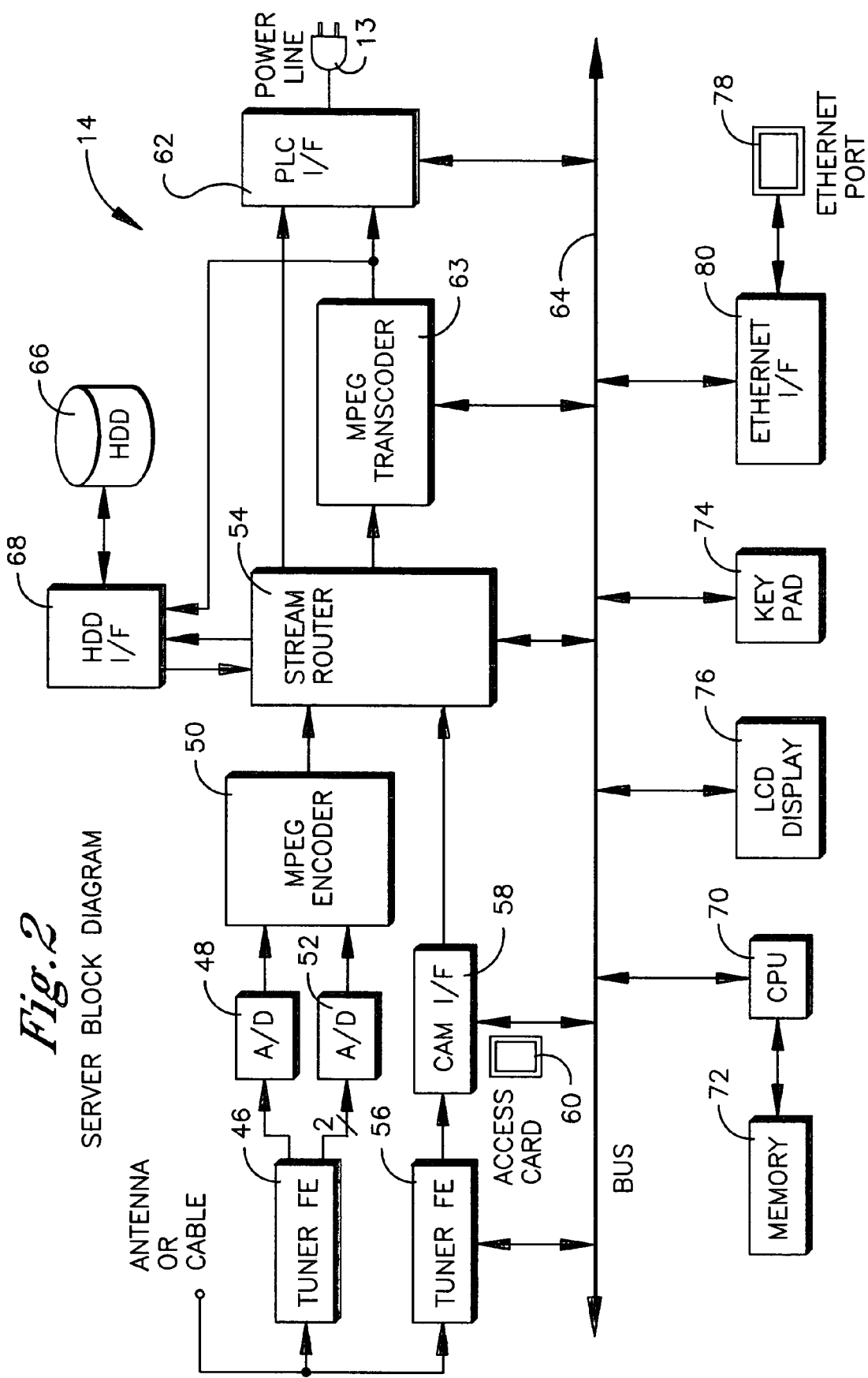

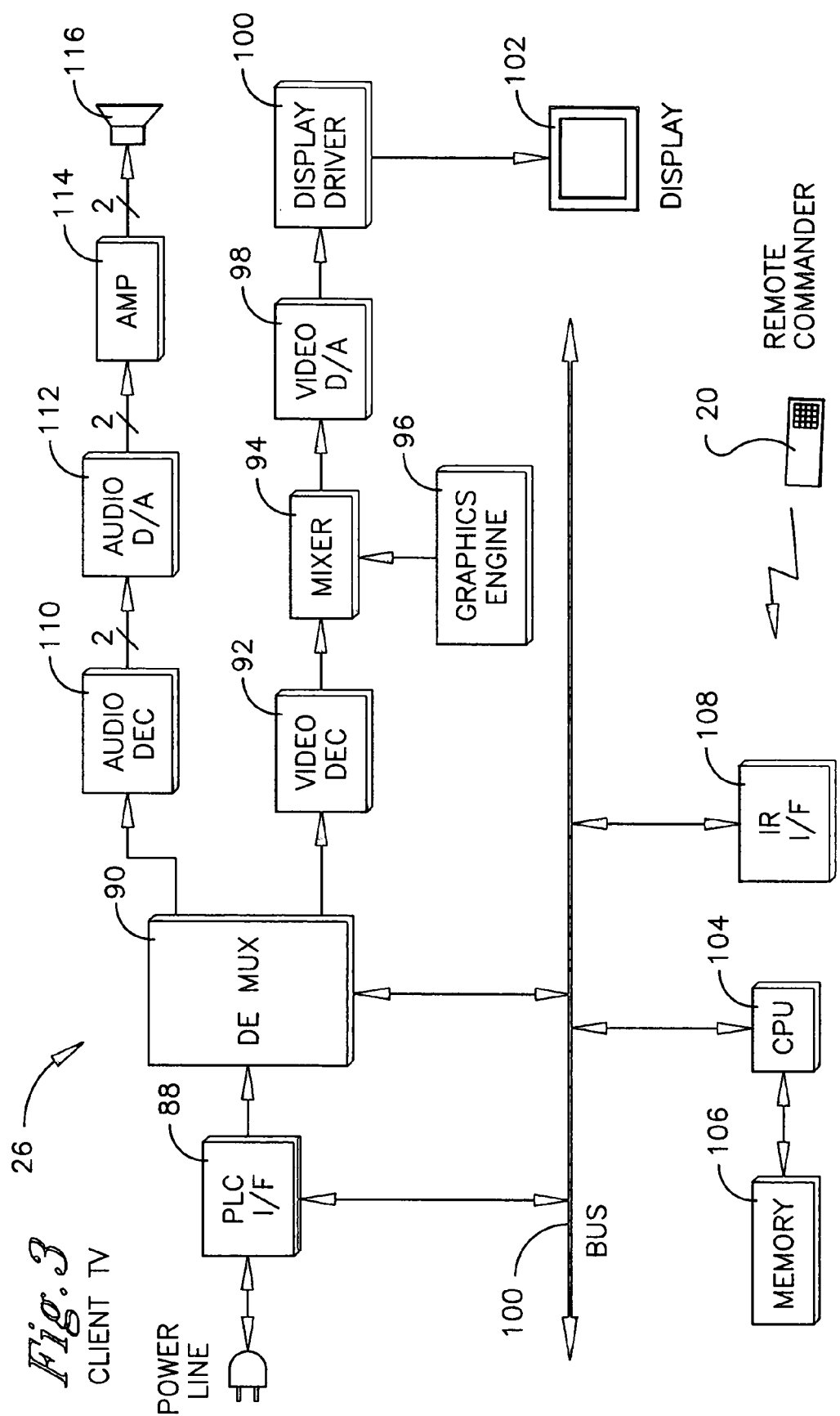
Fig. 3 CLIENT TV

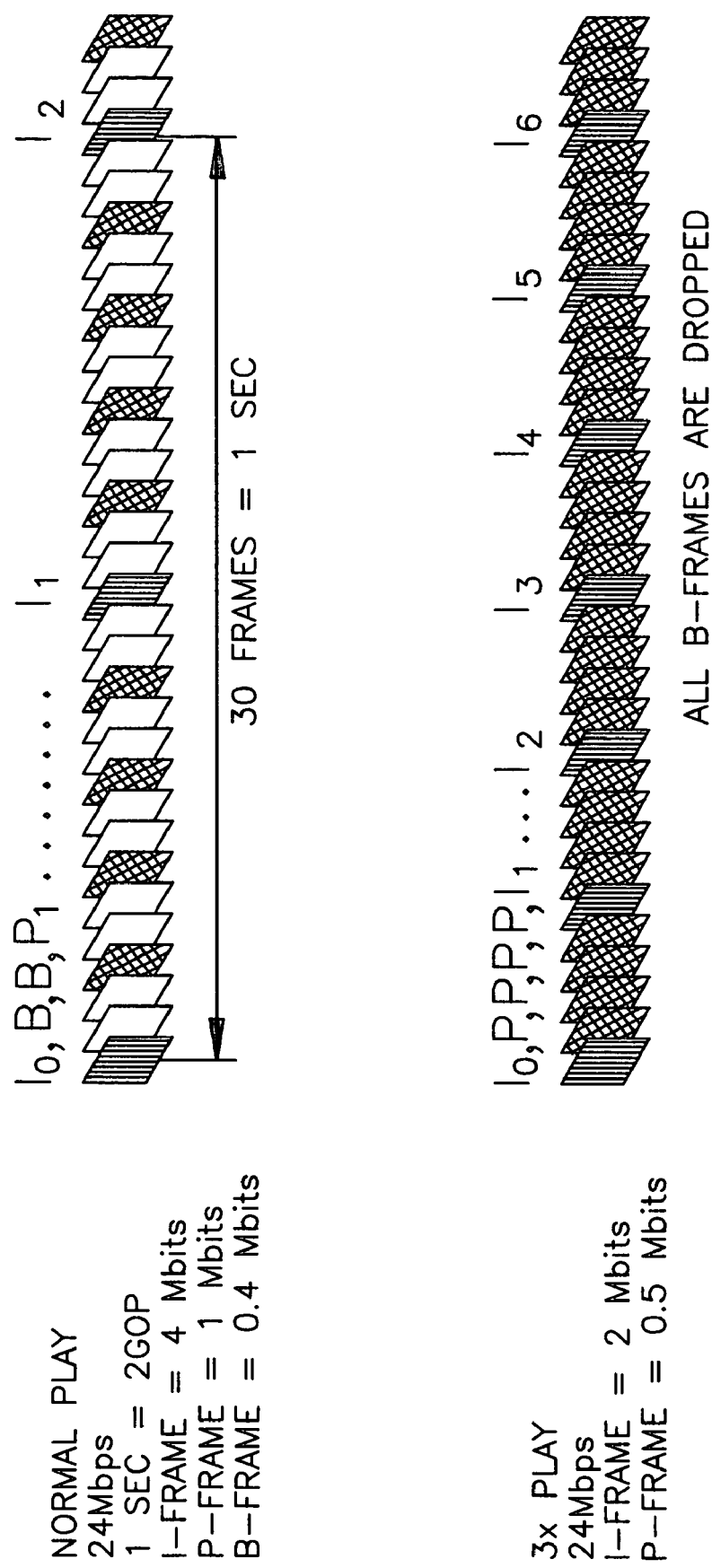
Fig. 4 FRAME SEQUENCES

SYSTEM AND METHOD FOR SMOOTH FAST PLAYBACK OF VIDEO

FIELD OF THE INVENTION

The present invention relates generally to video playback at faster than normal speeds.

BACKGROUND OF THE INVENTION

Multimedia can be formatted in accordance with Moving Pictures Expert Group (MPEG) standards such as MPEG-1, MPEG-2 (also referred to as DVD format), and MPEG-4. Essentially, for individual video frames these multimedia standards use Joint Photographic Experts Group (JPEG) compression, and add a temporal dimension to the spatial dimension of single pictures. MPEG is essentially a compression technique that uses motion estimation to further compress a video stream.

MPEG encoding breaks each picture into blocks called "macroblocks", and then searches neighboring pictures for similar blocks. If a match is found, instead of storing the entire block, the system stores a much smaller vector that describes the movement (or not) of the block between pictures. In this way, efficient compression is achieved.

MPEG compresses each frame of video in one of three ways. The first way is to generate a self-contained entity referred to as an "intraframe" (also referred to as a "reference frame" and an "information frame" and referred to herein as I-frames), in which the entire frame is composed of compressed, quantized DCT values using JPEG principles. This type of frame is required periodically and at a scene change. An I-frame thus is an example of a frame that is compressed (by virtue of using DCT values that are a form of compression) based solely on information in its own frame, i.e., without reference to information in any other frame.

Most frames, however, (typically 15 out of 16) are compressed by encoding only differences between the image in the frame and the nearest intraframe, resulting in frame representations that use much less data than is required for an intraframe. In MPEG parlance these frames are called "predicted" frames and "bidirectional" frames, herein referred to as P-frames and B-frames.

Predicted frames are those frames that contain motion vector references to the preceding intraframe and/or to a preceding predicted frame, in accordance with the discussion above. If a block has changed slightly in intensity or color, then the difference between the two frames is also encoded in a predicted frame. Moreover, if something entirely new appears that does not match any previous blocks, then a new block can be stored in the predicted frame in the same way as in an intraframe.

In contrast, a bidirectional frame is used as follows. The MPEG system searches forward and backward through the video stream to match blocks. Bidirectional frames are used to record when something new appears, so that it can be matched to a block in the next full intraframe or predictive frame, with predictive frames being able to refer to both preceding and subsequent bidirectional frames. Essentially, a B-frame is an example of a frame that represents information found only in its own frame and other information by reference to both a past and a future I-frame or P-frame.

Experience has shown that two bidirectional frames between each intraframe or predictive frame works well, so that a typical group of frames associated with a single intraframe might be: the full intraframe, followed by a predictive frame, followed by two bidirectional frames, another predictive frame, two more bidirectional frames, a predictive frame, two more bidirectional frames, a predictive frame, and finally two more bidirectional frames, at which point a new full intraframe might be placed in the stream to refresh the stream.

The present invention critically recognizes that when MPEG video is played in a fast mode, i.e., either fast forward or fast rewind, only I-frames are decoded, and since transmission networks typically have limited bandwidth, a video server can send only a limited number of I-frames under the given bandwidth.

In the typical group of pictures (GOP) mentioned above which consists of fifteen total frames (I, B, B, P, B, B, P, B, B, P, B, B, P, B, B), there is one I-frame, four P-frames, and ten B-frames. A fair assumption is that a P-frame has 25% of the amount of data in an I-frame and a B-frame has 10% of the amount of data of an I-frame. If the stream rate is 24 Mbps, one I-frame uses 8 Mbps, one P-frame uses 2 Mbps, and one B-frame uses 0.8 Mbps. Thus, up to three I-frames can be sent in one GOP time period (24 Mbps/8 Mbps=3). This means 3-time (3×) fast mode is available without dropping I-pictures at maximum. For 6× fast mode, however, every other I-frame must be dropped, or else an enlarged (and thus typically unavailable) bandwidth must be provided to send all the I-frames without dropping any. The present invention critically understands that if some I-frames are dropped, fast playback will be jumpy and the user cannot easily find the point he/she wants to see. Accordingly, the present invention recognizes a need for performing smooth fast playback without dropping I-frames.

SUMMARY OF THE INVENTION

A method for providing video includes transcoding first frames at a rate lower than a rate at which first frames are transcoded at a normal stream play speed to render down-rated first frames. A first frame is a frame, such as an I-frame, that represents information without reference to another frame. The method also includes presenting the down-rated first frames at a playback speed faster than the normal stream play speed.

In some implementations at least some I-frames in the video are down-rated and presented at the playback speed that is faster than the normal stream play speed. The I-frames can be down-rated as needed to satisfy bandwidth limitations. The method can also include down-rating second frames and presenting them with the down-rated I-frames at the playback speed that is faster than the normal stream play speed. A second frame is a frame, such as a P-frame, that represents information at least in a preceding I-frame and/or P-frame. No third frames need be presented at the playback speed. A third frame is a frame such as a B-frame that represents information at least in both a past and a future I-frame and/or P-frame.

In another aspect, a system includes a source of video including a video transcoder. The system also includes a logic device communicating with the transcoder and receiving fast playback commands, with the logic device causing the transcoder to down-rate substantially all I-frames in the video to render down-rated I-frames in response to a fast playback command. A display device receives the down-rated I-frames and displays them at a speed faster than normal playback speed.

In yet another aspect, a video system includes means for storing a video stream including I-frames, means for reducing the size of each I-frame to render reduced versions of each I-frame, and means for sending the reduced versions to a display means for display thereof in a fast playback mode in response to a fast playback command.

BRIEF DESCRIPTION OF THE DRAWINGS

The details of the present invention, both as to its structure and operation, can best be understood in reference to the accompanying drawings, in which like reference numerals refer to like parts, and in which:

FIG. 1 is a block diagram of a non-limiting exemplary home entertainment system;

FIG. 2 is a block diagram of a non-limiting exemplary server in the system;

FIG. 3 is a block diagram of a non-limiting exemplary client TV in the system; and FIG. 4 is a schematic diagram illustrating I-frame encoding at fast mode.

DETAILED DESCRIPTION OF THE PREFERRED EMBODIMENTS

Referring initially to FIG. 1, a home entertainment system is shown, generally designated 10, that includes a communication network 12. In the embodiment shown the network 12 can be a power line communication (PLC) network that interconnects various network devices which are plugged into the AC grid of a home using respective AC power plugs 13. Other types of wired or wireless networks may be used, e.g., Ethernet, 802.11, wireless, or other networks may be used.

The network devices can include one or more servers 14. The non-limiting server 14, which may be implemented as a set-top box, receives a signal from a cable 16 and/or Internet data from a modem 18 that may be, for example, a cable modem or an ADSL telephone line modem. Also, the server 14 may receive remote commands through the power line network 12 such as, e.g., channel up/down initiated from a remote commander 20. The server 14 can send and receive audio/video (A/V) streams, commands, and data over the network 12.

Also, a client TV system 26 can communicate with the network 12. The client TV system 26 can receive a video stream from the server 14 and exchange commands and data over the network 12. Thus, for instance, the client TV system 26 can receive a command from the remote commander 20 and forward the command to a destination, for example, to the server 14.

FIG. 2 shows aspects of one non-limiting server 14, the components of which that are illustrated in FIG. 2 may be contained in a single housing. As shown, the server 14 may receive an analog cable signal that is tuned and demodulated in a tuner frontend 46. The video output from the tuner frontend 46 can be digitized in an analog to digital converter (ADC) 48 and MPEG-encoded in a broadcast MPEG encoder 50. Similarly, the audio output from the tuner frontend 46 is digitized at an ADC 52 and MPEG encoded in the broadcast MPEG encoder 50. The output stream from the broadcast MPEG encoder 50 may be sent to a stream router 54.

Additionally, the server 14 may include a digital frontend 56 for receiving, tuning, and demodulating digital signals. The output of the digital frontend 56, if encrypted, can be decrypted by a conditional access module 58 that may cooperate with an access card 60 in accordance with access principles known in the art. As shown in FIG. 2, the digital stream is sent to the stream router 54.

As shown in FIG. 2, the stream router 54 can send a selected stream to a server PLC interface 62, which is plugged into the exemplary PLC network 12 via a plug 13. Or, the stream router 54 may send a stream to an MPEG transcoder 63 and thence to the PLC interface 62 as shown. The MPEG transcoder 63 can transcode the incoming stream at a lower rate than the original rate so that the stream can still be sent when the powerline condition gets worse and the available bandwidth reduces.

The server 14 can include an internal server bus 64 that is connected to the server PLC interface 62 (and, hence, to the network 12). Also connected to the bus 64 are the digital fronted 56, CAM interface 58, MPEG transcoder 63, and PLC interface 62. The bus 64 is, for example, a PCI bus. The stream router 54 may forward a stream to a hard disk drive (HDD) 66 via a HDD interface 68 for recording. Other storage devices, e.g., DVDs, may be used. A playback stream from the HDD 66 may be returned to the stream router 54 and sent to the server PLC interface 62 for transmission to other components discussed further below. The server PLC interface 62 can time-multiplex input signals and send them to the network 12 shown in FIG. 1.

The server 14 may also have a server CPU 70 that controls the components of the server 14 through the server's internal bus 64 and that executes control software in accordance with logic set forth herein. The control software may be stored in, e.g., a solid state memory 72. An input device such as but not limited to a keypad 74 can be used to input data to the server CPU 70 through the server internal bus 64. Also, an output device such as an LCD 76 can be used to indicate data sent from the server CPU 70, for example, tuning status, network status, error messages, etc. The modem shown in FIG. 1 may be connected to an Ethernet port 78 for conveyance of data to the server CPU 70 through an Ethernet interface 80.

With the above non-limiting server 14 in mind, in a recording mode, the incoming stream can be sent to the HDD interface 68 for recording to the HDD 66. The HDD I/F 68 can give a timestamp to each packet in the stream to record. The incoming stream may be down-rated in the MPEG Transcoder 63 before being sent to the HDD 66. Down-rate transcoding is performed for HDD space saving or long time recording at the cost of picture quality. If desired, the user may download an AV stream from an Internet site using the Ethernet port 78, which can be stored in the HDD 66 like other streams.

For playback, a stream from the HDD 66 is sent to the stream router 54 through the HDD I/F 68, which injects each packet based on its timestamp. The stream router 54 sends the stream to the PLC I/F 62 directly or via the MPEG transcoder 63 for bit rate reduction as appropriate.

FIG. 3 illustrates a block diagram of the client TV 26, the components of which may be contained in a single housing. A TV PLC interface 88 can receive a signal sent over the network 12. The output video signal from the TV PLC interface 88 is demultiplexed in a demultiplexer 90 and sent to a video decoder 92. The decoder 92 outputs a signal to a mixer 94, wherein decoded video signals may be, if desired, mixed with graphics data (On Screen Display data) generated in a graphics engine 96. The signal is then sent to a digital to analog converter (DAC) 98 for analogizing the data for processing thereof in a display driver 100. The display driver 100 sends video signals to a video display 102.

As shown in FIG. 3, a TV CPU 104 can be provided for communicating with various TV components over an internal data bus 106, which is connected to the TV PLC interface 88 (and, hence, to the network 12) as shown. The TV CPU 104 consequently can communicate asynchronous data such as commands, data, etc. with the server CPU 70 shown in FIG.

2. The TV CPU 104 can execute control software in accordance with logic herein. The software can be stored in a TV memory 106.

If desired, an infrared communication interface 108 can be provided for receiving commands from the remote commander 20 shown in FIG. 1. Received commands may be sent to the TV CPU 104 through the internal TV bus 106, and thence to the server CPU 70. For instance, fast playback commands from the remote can be sent from the client TV to the server to invoke the logic below.

FIG. 3 also shows that audio from the demultiplexer 90 may be sent to an audio decoder 110 for decoding, and then to an audio DAC 112 for analogizing. The audio signal may be amplified by an amplifier 114 and played on speakers 116.

In accordance with present principles, in a fast playback mode, e.g., three times faster than normal or six times faster than normal, only I-frame data is read from the HDD 66 by the server 14 and is sent to the client TV 26. Because the data transmission rate from the HDD 66 can be much faster than the stream rate, the HDD 66 reads the data intermittently so that the data rate does not exceed the given streaming bandwidth.

In an example situation in which a bandwidth of 24 Mbps is provided and an I-frame rate is 8 Mbps, only up to 3× fast mode is available without dropping I-frames, whereas the present invention provides for faster playback as follows. Under control of, e.g., the server CPU 70, when fast playback commands are received, I-frames are read out of the HDD 66 and sent to the MPEG transcoder 63 where they are down-rated, for example, to one-half of the original rate. Thus, using the example above the I-frame rate is 4 Mbps after being down-rated rated from 8 Mbps. This in turn means that for the hypothetical bandwidth of 24 Mbps, 6× playback is available without losing any I-frames. Extending this principle, if the original rate is transcoded to 2 Mbps, 12× playback is available. Thus, the size of each I-frame may be reduced in proportion to the demanded playback speed.

It is noted that in some implementations the decoder can decode up to fifteen frames in one group of pictures (GOP) time period, and that the server 14 cannot send more than fifteen frames, in which case the maximum fast playback speed without undesirable I-frame dropping is 15 times normal speed. If desired, the transcoder 63 may adjust the transcoding rate for the I-frames in order to adapt to the particular powerline transmission condition.

On the receiver (client TV 26) side, the video decoder 92 decodes incoming I-frames one after another. In one implementation, there are no P- or B-frames. It is not required to change the frame order. When the fast mode is finished, the transcoding rate reverts to the original (normal) playback rate. Although reduced transcoding degrades picture quality, picture quality in fast playback modes, including fast forward and fast reverse, is not a significant issue. Instead, for FF/FR, it is more important to find the exact frame the user wants to see.

In the event that a stream (that might be, e.g., downloaded over the Internet) has no I-frame position information, a software program or a hardware circuit can index the stream in advance so that the adjacent I-frames are easily found in fast mode.

In non-limiting implementations, audio data may be sent with the video, with the MPEG transcoder 63 passing the audio packets without transcoding. Generally, the audio data rate is only a few per cent of the video rate, meaning its impact on bandwidth usage is minimal.

The above principles may also be applied to other AV codec technologies, for example, H.264/AVC.

In other implementations, as shown by the example of FIG. 4, the normal speed stream in the top sequence of frames may include two GOP per second, with one 4 Mbit I-frame per GOP and with each GOP containing two B-frames of 0.4 Mbits followed by a P-frame of 1 Mbit, with this pattern repeating until the next I-frame. In contrast, a fast (3×) playback speed can be provided as shown in the bottom sequence of frames, with all B-frames being dropped and with both I-frames and P-frames being transcoded at one-half their normal rate. This achieves fast playback using all (down-rated by one half) of the I-frames in the original stream as well as all (down-rated by one half) P-frames in the original stream, while remaining within the original 24 Mbps bandwidth, so that fast playback is rendered comparatively smoother.

In some implementations, not all I-frames and/or B-frames are down-rated; instead, some may be sent without down-rating them, network bandwidth permitting.

While the particular SYSTEM AND METHOD FOR SMOOTH FAST PLAYBACK OF VIDEO as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. A method for providing video comprising:
    transcoding first frames at a rate lower than a rate at which first frames are transcoded at a normal stream play speed to render down-rated first frames, a first frame representing information without reference to another frame;
    presenting the down-rated first frames at a playback speed faster than the normal stream play speed, and adjusting the rate at which the first frames are transcoded according to a current powerline communication transmission condition.

2. The method of claim 1, wherein the first frames are I-frames.

3. The method of claim 2, wherein at least some I-frames in the video are down-rated and presented at the playback speed that is faster than the normal stream play speed.

4. The method of claim 2, wherein the I-frames are down-rated as needed to satisfy bandwidth limitations.

5. The method of claim 2, comprising down-rating second frames and presenting them with the down-rated I-frames at the playback speed that is faster than the normal stream play speed, a second frame representing information at least in a preceding first frame and/or second frame.

6. The method of claim 5, wherein the second frames are P-frames.

7. The method of claim 6, wherein no third frames are presented at the playback speed that is faster than the normal stream play speed, a third frame representing information at least in both a past and a future I-frame and/or P-frame.

8. A system, comprising:
a source of audio and video including at least one video transcoder;
at least one logic device communicating with the transcoder, the logic device receiving commands including fast playback commands, wherein the logic device causes the transcoder to down-rate at least some I-frames in the video to render down-rated I-frames in response to a fast playback command, audio packets accompanying the video not being transcoded or otherwise down-rated; and
a display device receiving the audio and down-rated I-frames and displaying them at a speed faster than normal playback speed.

9. The system of claim 8, comprising a disk storing the video, the logic device causing the disk to send the video to the transcoder.

10. The system of claim 8, wherein only I-frames, and no P-frames or B-fames, are sent to the display device in response to a fast playback command.

11. The system of claim 8, wherein only I-frames and P-frames but no B-frames are sent to the display device in response to a fast playback command.

12. The system of claim 8, wherein the video is in MPEG format.

13. The system of claim 8, wherein the speed faster than normal playback speed is at least two times the normal playback speed.

14. The system of claim 8, wherein the I-frames are do down-rated.

15. The system of claim 10, wherein the P-frames are down-rated and presented with the down-rated I-frames in response to a fast playback command.

16. A video system, comprising:
means for storing a video stream including I-frames;
means for reducing the size of some but not all I-frames to render reduced versions of some but not all I-frames; and
means for sending the reduced versions and non-reduced I-frames to a display means for display thereof in a fast playback mode in response to a fast playback command.

17. The system of claim 16, wherein the means for storing includes at least one disk.

18. The system of claim 16, wherein the means for reducing is a transcoder.

19. The system of claim 16, wherein the means for sending is a CPU.

20. The method of claim 1, wherein the first frames are down-rated in proportion to the playback speed.

21. The system of claim 8, the I-frames being down-rated in proportion to demanded speed associated with the first playback command.

22. The system of claim 16, wherein the means for reducing reduces the size of at least some I-frames in proportion to a demanded playback speed.

* * * * *

UNITED STATES PATENT AND TRADEMARK OFFICE
CERTIFICATE OF CORRECTION

PATENT NO. : 7,596,300 B2 Page 1 of 1
APPLICATION NO. : 11/295951
DATED : September 29, 2009
INVENTOR(S) : Ryuichi Iwamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this

Twenty-eighth Day of September, 2010

David J. Kappos
*Director of the United States Patent and Trademark Office*